(12) United States Patent
Haizima et al.

(10) Patent No.: US 7,091,430 B1
(45) Date of Patent: Aug. 15, 2006

(54) JOG SWITCH

(75) Inventors: Toshio Haizima, Shinagawa-ku (JP);
Yutaka Kuramitsu, Shinagawa-ku (JP);
Kenichi Miwa, Shinagawa-ku (JP)

(73) Assignee: SMK Corporation, Tokyo (JP)

( * ) Notice: Subject to any disclaimer, the term of this patent is extended or adjusted under 35 U.S.C. 154(b) by 0 days.

(21) Appl. No.: 11/293,290

(22) Filed: Dec. 1, 2005

(30) Foreign Application Priority Data

May 19, 2005 (JP) .............................. 2005-147223

(51) Int. Cl.
*H01H 25/04* (2006.01)
(52) U.S. Cl. ........................... 200/6 A; 200/4; 200/5 R
(58) Field of Classification Search .................... 200/4, 200/5 R, 6 A, 14, 17 R, 18; 341/22, 35; 345/156, 157, 160, 161, 168, 169, 184
See application file for complete search history.

(56) References Cited

U.S. PATENT DOCUMENTS

| | | | | |
|---|---|---|---|---|
| 5,621,196 A | * | 4/1997 | Nishijima et al. | 200/6 A |
| 5,877,463 A | * | 3/1999 | Choi | 200/4 |
| 6,396,006 B1 | * | 5/2002 | Yokoji et al. | 200/4 |
| 6,636,197 B1 | * | 10/2003 | Goldenberg et al. | 345/156 |
| 6,762,372 B1 | * | 7/2004 | Nishimoto et al. | 200/4 |
| 6,812,415 B1 | * | 11/2004 | Priesemuth | 200/5 R |
| 6,903,288 B1 | * | 6/2005 | Varga | 200/6 A |

* cited by examiner

*Primary Examiner*—Michael A. Friedhofer
(74) *Attorney, Agent, or Firm*—Darby & Darby

(57) ABSTRACT

A jog switch by which a desired position can be confirmed without releasing the finger rotating a jog dial after the desired direction and angle are selected. The jog switch includes the jog dial, which is capable of rotating in a plane and also rocking in the orthogonal direction, a plurality of confirmation switches disposed on a surface behind the jog dial and a jog action detecting part, which is disposed behind the jog dial and can detect the direction and angle of rotation, wherein the operation of the jog dial is confirmed by pressing the confirmation switch by rocking the jog dial.

9 Claims, 4 Drawing Sheets

JOG SWITCH

INCORPORATION BY REFERENCE

The present application claims priority under 35 U.S.C. §119 to Japanese Patent Application No. 2005-147223 filed on May 19, 2005. The content of the application is incorporated herein by reference in its entirety.

BACKGROUND OF THE INVENTION

The present invention relates to a jog switch with a cursor switch, and in more detail, to a jog switch in which selection by the jog switch may be confirmed by a switch with a cursor function.

Jog switches conventionally emit pulse signals according to the rotation of the rotor by rotating a jog dial, and the switching action is carried out by detecting the rotary angle from the pulse signals.

A conventional jog switch 100 shown in FIG. 5 is composed of a jog dial 101 implemented on a printed board PCB, and is rotatably mounted to the printed board. Further, behind the jog dial 101 on the printed board, a jog action detector 102 which can detect the direction and angle of rotation is disposed.

Still further, an opening 103 is disposed in the center of the jog dial 101 in a doughnut shape and a push type center switch 104 is disposed in the opening. The push type center switch 104 includes a switch part 104a, which is implemented on the printed board PCB, right under the opening 103, and a push button part 104b, which activates the switch part 104a and is located on top of the switch part 104a that is in the opening 103.

In the conventional jog switch 100 composed as described above, the jog action detector 102 detects the rotating direction and angle and outputs this information as pulse signals upon rotating the jog dial 101.

The predetermined operation with the jog dial 101 is finished when, for example, a cursor on a display reaches to a desired position being moved by the pulse signals generated from the direction and angle of rotation of the jog dial 102 by the rotation of the jog dial 102, and then the operator presses the center switch 104 confirming the indication by the jog dial 101 to execute the operation of the jog dial 101. Of course, other actions executed by the jog dial 101 to confirm the position and the like may be executed using switches other than the center switch 104 (not shown).

However, in using the jog switch 100 shown in the conventional example, it is necessary to release the finger rotating the jog dial 101 to operate the center switch or other switch (not shown) or the like, when the operation of the jog dial 101 is finished. Thus, in a operation which requires precision of rotating action of the jog dial 101, there has been a problem of deviating from the desired rotation of the jog dial 101 on releasing the finger from the jog dial 101, and the execution of the predetermined operation is impossible or difficult.

Further, at least the conventional jog switch 100 is required to have a confirmation switch such as the center switch 104 and the like, and there is a problem of needing an extra space for the confirmation switch on the operation panel when implementing in a small remote control device.

OBJECT AND SUMMARY OF TH INVENTION

The object of the present invention is to take the above mentioned problems into consideration and provide a jog switch which can be confirmed accurately and easily at the rotating position after the jog dial is rotated to a desired amount, wherein there is no need for disposing an extra switch and the like on the operation panel of the device.

To make confirmation without releasing a finger from the jog dial after the desired operation of the jog dial is completed, the present invention provides a jog switch which includes a jog dial which can rotate in a plane and also rock in a direction orthogonal to the plane of rotation, a plurality of confirmation switches disposed behind the jog dial, and a jog action detector which is disposed under the jog dial and can detect the direction and angle of rotation of the jog dial. The jog dial operation is confirmed by pressing down the confirmation switch by rocking the jog dial.

Thus, in this jog switch, after rotating to the desired direction and angle in the plane of rotation, the jog dial is rocked, and the operator can rock the jog dial without releasing his finger from the jog dial.

The rocked jog dial presses any of a plurality of the confirmation switches disposed behind the jog dial, and the desired direction and angle are confirmed by the operator's operation.

Thus, according to the present invention, after a desired direction and angle are selected, the selection is confirmed by rocking the jog dial, and therefore achieved is the specific merit of the present invention that the desired direction and angle may be confirmed surely without releasing the finger from the jog dial.

Further, since the implementation of the jog switch negates the need for a switch by which the operator confirms the desired direction and angle selected by the jog switch and the need to dispose a confirmation switch other than the jog switch, the space in the operation panel on which the jog switch is to be disposed is not needed, and thus achieved is the specific merit of the present invention that the device using the jog switch may be made smaller.

BRIEF DESCRIPTION OF THE DRAWINGS

The above, and other objects, features and advantages of the present invention will become apparent from the following description read in conjunction with the accompanying drawings, in which like reference numerals designate the same elements.

DETAILED DESCRIPTION OF THE EMBODIMENTS

A disc shaped jog dial is disposed in the jog switch. This jog dial is mounted so that it is rotatable in a plane, that is, a plane parallel to the printed board on which the jog switch is implemented. Further, this jog dial is disposed so that it may be rocked in a direction that is orthogonal to the plane of rotation by pressure applied by the operator. This rocking plane is disposed so that the jog dial may be rocked freely on the whole circumference of the jog dial. The rocking motion of the jog dial is accompanied with a clicking feeling and the jog dial returns to the rotating plane by energizing force after the pressure is relieved.

A plurality of confirmation switches, which are brought to ON condition by the rocked jog dial, are disposed under the jog dial, that is, on the face of the jog dial side of the printed board. These confirmation switches are disposed on 8 sites in circle, equidistance from the rotating shaft every 45 degrees in plan view.

Further, a jog action detector, which can detect rotating angle and rotating direction, is disposed on the printed board, under the jog dial. The jog action detector is a switch which is rocked by comb teeth shaped projections that are disposed in a circular formation under the jog dial. The jog action detector may be rocked in two directions corresponding to left or right rotation of the jog dial and can detect these directions. The jog action detector can also detect the rotating angle of the jog dial by repeating in a pulse like manner ON/OFF, each time it is rocked by the comb teeth shaped projections.

Still further the jog action detector may be an optical detector wherein a striped pattern is placed in a circle on the area opposite to the jog action detector on the back of the jog dial, and the direction and the angle of the rotation are detected using the reflection of the laser light emitted from the jog action detector.

Figure 1:
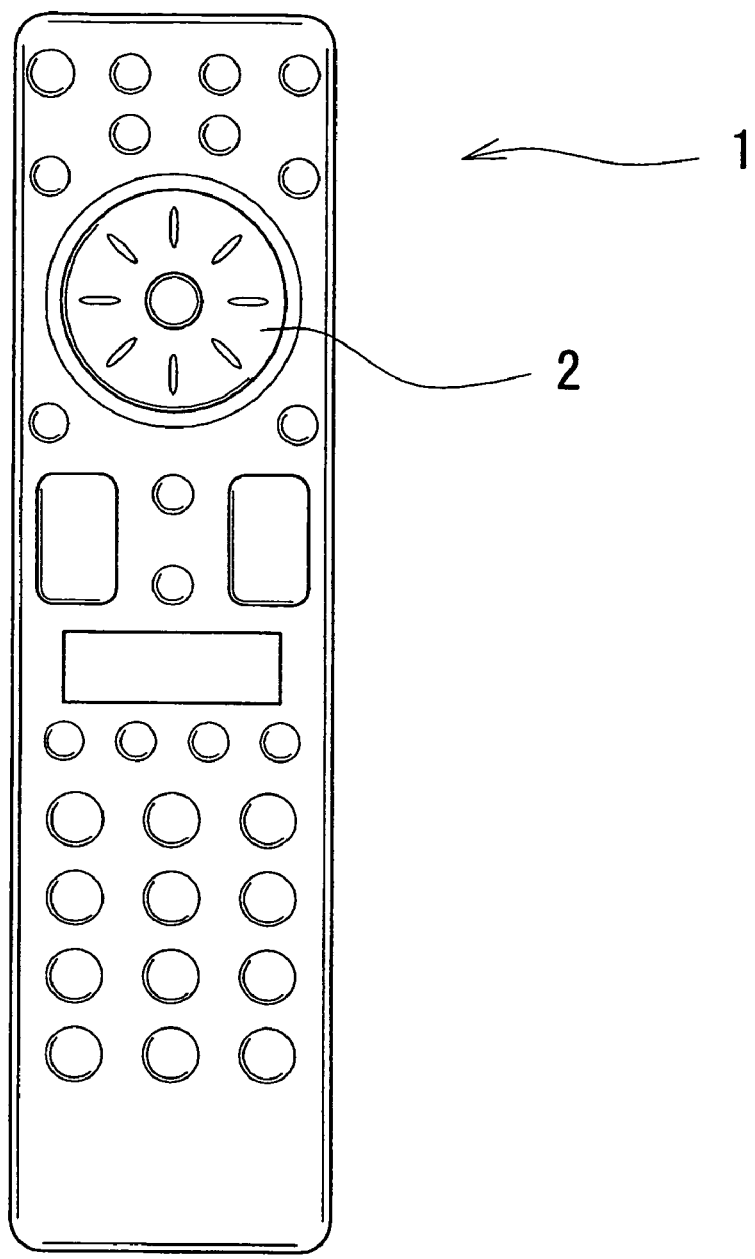
FIG. 1 is a front view of a remote control having the jog switch of the present invention.

As shown in FIG. 1, a remote control 1 is equipped with the jog switch 2 of the present invention, and in this embodiment the remote control is for a TV capable of receiving satellite broadcasts. The remote control 1 is equipped with a channel switch which changes channels of the TV, a volume control switch and the like, and various selections are made possible with jog switch 2.

Figure 2:
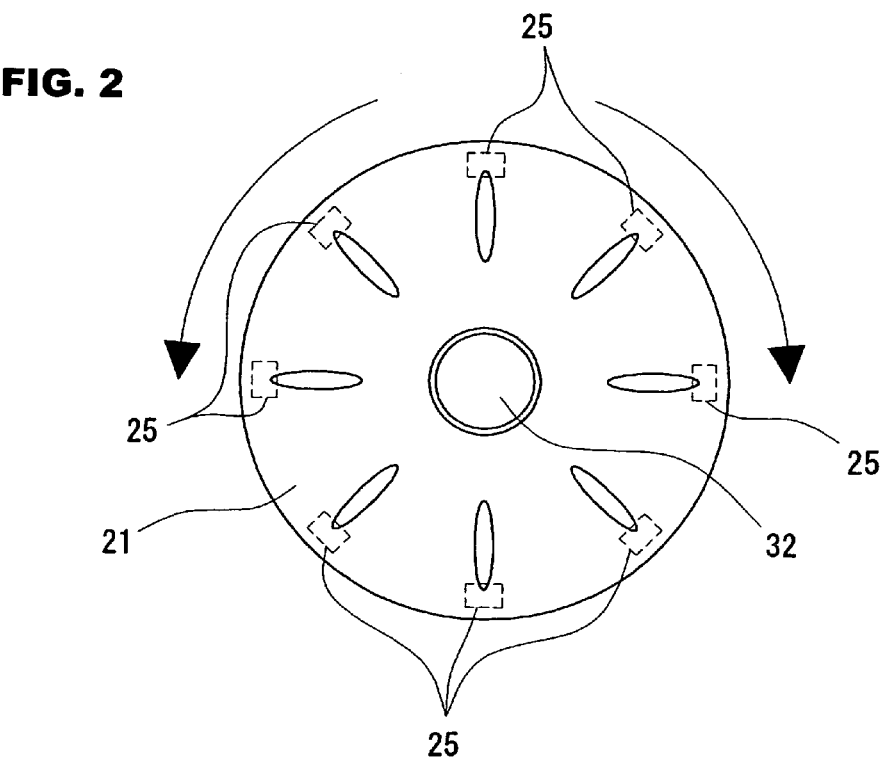
FIG. 2 is a front view of the jog switch of the present invention.
Figure 3:
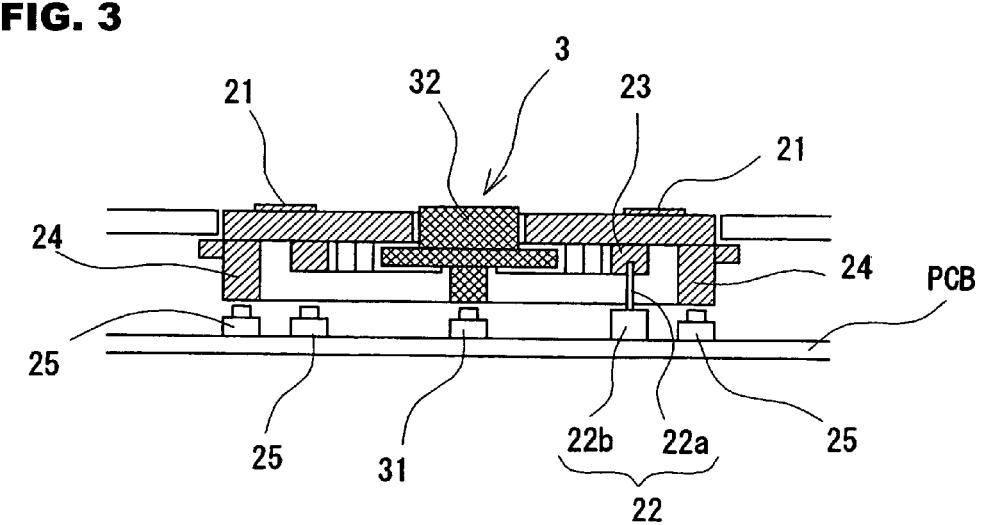
FIG. 3 is a central longitudinal section of FIG. 2.

FIG. 2 is a front view of the enlarged jog switch 2 and FIG. 3 is a longitudinal section of FIG. 2. A jog dial 21 which is rotatable both left and right is disposed in the jog switch 2. The jog dial 21 is a disc with a hole in the center shaped like a doughnut and small dips are formed on the surface for a user's finger to catch for facilitating rotation. The jog dial 21 is supported on the remote control 1 by silicon rubber or the like, which is formed like a cup so that the jog dial is rotatable to the left and the right around the center hole and may be rocked.

Further, on the back of the jog dial 21, a rotation projection 23 is disposed on a circle which is co-axial with the rotating shaft. The rotation projection 23 is composed of a multiplicity of plates projecting toward the printed board PCB in predetermined equal distance. In other words the rotation projection 23 is installed in a projecting manner in equal gaps like dominos.

A jog action detector 22 is disposed on the printed board PCB facing the back of the jog dial 21. The jog action detector 22 can detect the rotating angle of the jog dial 21 by the rotation projection 23.

The jog action detector 22 is made of a counter switch which is capable of switching to the two rotatable directions of the jog dial 21 and is composed so that the direction and angle of rotation may be measured by the direction of switching and the number of switches. Thus, when a plate of the rotation projection 23 is moved toward the near side in FIG. 3, that is, when the jog dial 21 is rotated clockwise in FIG. 2, then the toggle 22a of the jog action detector is pushed down toward the near side and the rotation switch 22b is switched according to the direction which the toggle 22a fell. After passing of the rotation projection 23, the toggle 22a returns to the original position, and then, when the next rotation action indicator projection 23 pushes down the toggle 22a again to the direction of the rotation, the rotation switch 22b is switched according to the direction which the toggle fell and counting is carried out. This counting is outputted by the jog action detector 22 emitting merely pulse signals, and the regulation part which is not shown in the drawings counts these signals. Further, when the jog dial 21 is rotated toward the far side, not toward the near side in FIG. 3 (in FIG. 2, counter clockwise), the toggle 22a is composed to be pushed down toward the far side, and the rotation switch 22b is switched according to the direction of rotation, and the switching signal is outputted.

The jog dial 21 is composed in such a way that its outside circle is clickable. That is, in FIG. 3, each of the outside circle, which is shown in the left and right of the jog dial 21, may be tilted by being pressed toward the printed board, and the tilting is cancelled by relieving the pressure. The jog dial 21 is also composed so that the click is felt when the pressure is applied for tilting. The pressure for tilting may be applied in the whole outside circle of the jog dial 21 when the predetermined condition is brought about by rotating the jog dial 21.

Further, the switching projection 24 is implemented in a projecting manner on the whole periphery of the outer circle on the back of the jog dial 21 facing the printed board PCB. Confirmation switches 25 are disposed facing the switching projection 24 on the printed board PCB every 45 degrees in a radial direction. The confirmation switch 25 is a microswitch which is set ON by being pressed by the switching projection 24. The confirmation switch 25 outputs a confirmation signal by pressing any of the 8 switches, and any of the 8 switches detect the confirmation action by the jog dial 21.

Thus, after rotating the jog dial 21 a desired amount, the jog dial 21 is pressed to a tilting position to confirm the rotated amount. Specifically, the jog dial 21 is tilted by the pressure, the switching projection 24 presses the confirmation switch 25 located nearest the location of pressure to set ON, and the confirmation switch 25 outputs the confirmation signal.

In this embodiment, the confirmation switch 25 is disposed in 8 places at every 45 degrees to detect the tilting of the jog dial 21, but it may be disposed in 4 places at every 90 degrees or 6 places in every 60 degrees or the like in an appropriate manner.

The center switch 3 includes a center button 32 disposed in the hole formed in the center of the jog dial 21, and the center switch actuator 31, which is a microswitch, is disposed on the printed board PCB facing the center button 32. Thus the center switch 3 can output the ON signal by pressing the center button 32 and setting ON the center switch actuator 31, which is a microswitch.

Figure 4:
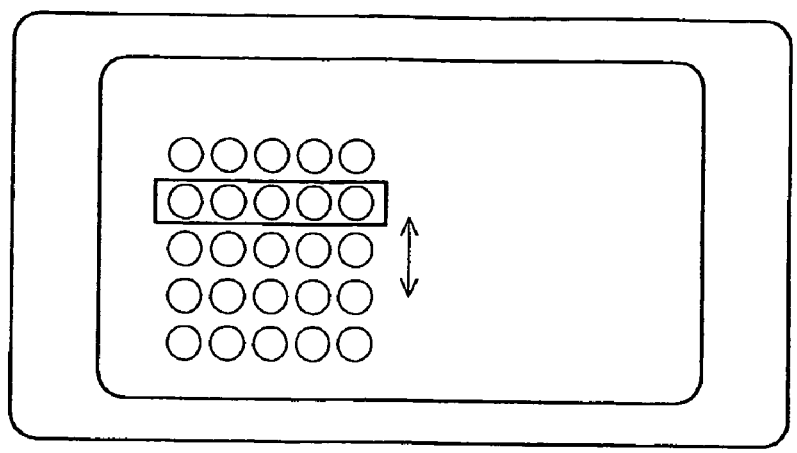
FIG. 4 is a schematic diagram showing the display condition.
Figure 5A:
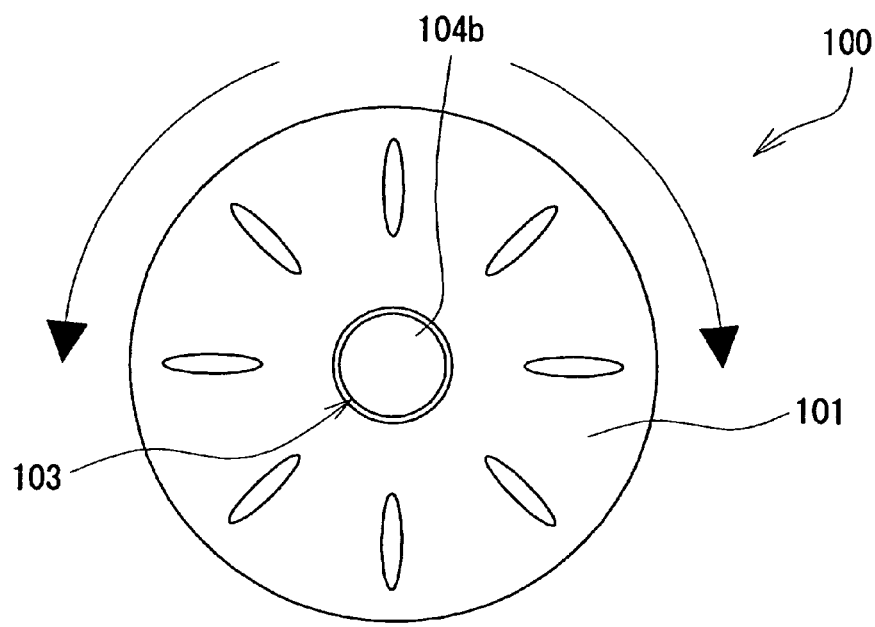
FIG. 5(a) shows an example of a conventional jog switch in a plan view.
Figure 5B:
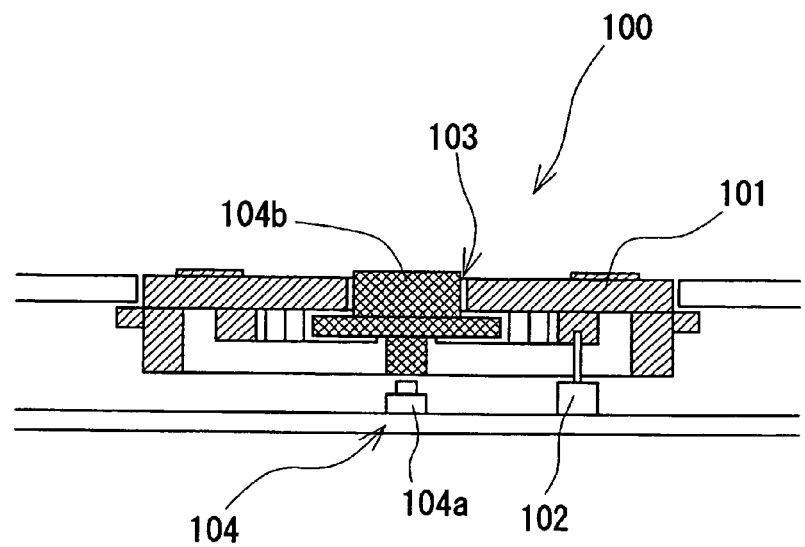
FIG. 5(b) is a central longitudinal section of FIG. 5(a).

The jog switch 2 is connected electrically to the regulation part of the remote control 1 on the printed board PCB, and the information is confirmed by setting the confirmation switch ON by tilting the jog dial 21, wherein the information is based on the signal of the direction and the angle of rotation detected by the jog action detector 22, for example, desired information shown on a TV monitor as "OOO" in FIG. 4, which is selected by scrolling with the rotation of the jog dial 21 toward the direction of the arrow when the information appears.

In the embodiment described above, the amount of rotation and the direction of rotation of the jog dial 21 are detected by the jog action detector 22 disposed on the printed board PCB facing the jog dial 21 and the rotation projection 23 disposed in the back of the jog dial 21. However, other compositions may be possible to detect the direction and the angle of rotation of the jog dial 21 such as using an optical switch as the jog action detector wherein the jog action detector 22 is composed of a light sensor and a slit like black pattern disposed on the back of the jog dial 21 formed in a circle, wherein the number of the slits over which the light sensor passes with the rotation of the jog dial 21 is outputted.

Although the jog switch 2 is installed on the remote controller 1 in this embodiment, it may also be installed on a keyboard of a personal computer, cellular telephone and the like.

Thus the jog switch of the present invention may be used not only in the remote controller but also in cellular telephones, keyboards and the like as an input device, and therefore it may be utilized as switches for consumer electronics, automobile and the like to move to the desired location and to confirm the location by rotating motion.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A jog switch comprising:
    a jog dial rotatable in a plane and rockable in a direction orthogonal to the plane of rotation;
    a plurality of confirmation switches disposed on a surface under the jog dial; and
    a jog action detector disposed under said jog dial for detecting a direction and angle of rotation of said jog dial,
    wherein an operation of the jog dial is confirmed by pressing said confirmation switches by rocking said jog dial.

2. The jog switch of claim 1 further comprising a center switch surrounded by said jog dial.

3. The jog switch of claim 1 further comprising a rotation projection on the back of the jog dial, the rotation projection including a plurality of projecting plates formed in a circle,
    wherein the jog action detector includes a toggle switchable by a passing of a plate of the rotation projection.

4. The jog switch of claim 1 wherein the jog action detector is optical.

5. The jog switch of claim 1 wherein the jog dial is supported by silicon rubber.

6. A method of using a jog switch comprising the steps of:
    rotating a jog dial in one of a clockwise or counterclockwise direction whereby the rotation results in scrolling through a list of operations; and
    rocking said jog dial for selecting a desired operation.

7. The method of claim 6 wherein the rotation of the jog dial is executed around a center switch.

8. The method of claim 6 wherein the rocking is accompanied by a clicking of the jog dial.

9. The method of claim 6 wherein the rotating is accompanied by a clicking of the jog dial.

* * * * *